Aug. 22, 1944.  J. A. PATTERSON  2,356,348
PURIFICATION OF ORGANIC LIQUIDS
Filed July 30, 1941
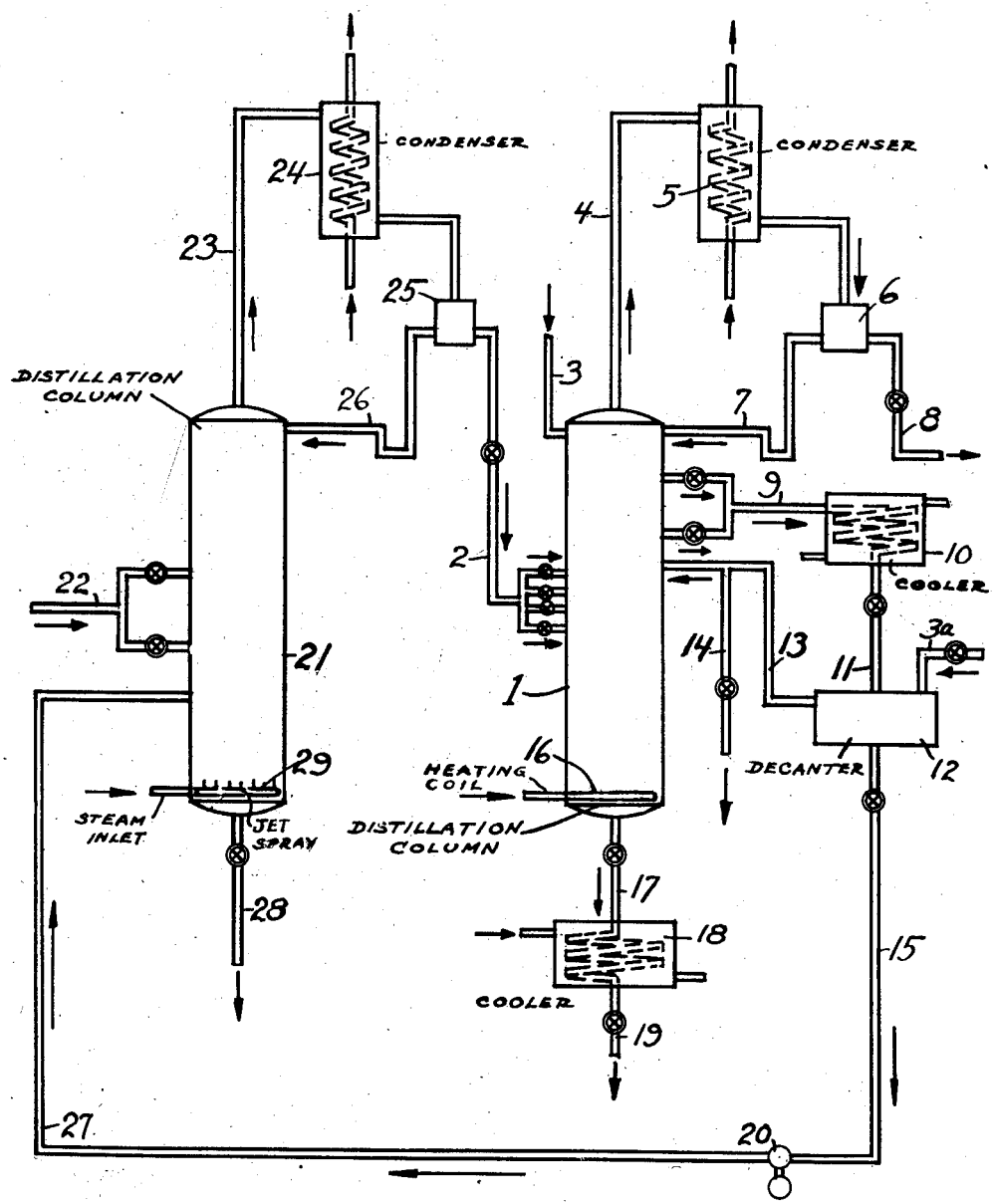
John A. Patterson Inventor
By JCSmall Attorney Patented Aug. 22, 1944

2,356,348

UNITED STATES PATENT OFFICE 2,356,348

PURIFICATION OF ORGANIC LIQUIDS

John A. Patterson, Westfield, N. J., assignor to Standard Oil Development Company, a corporation of Delaware Application July 30, 1941, Serial No. 404,598

12 Claims. (Cl. 202—42)

This invention relates to a process for the purification of organic liquids which as produced are associated with water and low boiling impurities. The invention relates particularly to the purification of alcohols prepared by the treatment of olefins with sulfuric acid.

To insure a high degree of operating efficiency in azeotropic dehydration processes, it is ordinarily necessary to remove low boiling impurities from the crude organic liquid in order to obtain a satisfactory azeotropic distillate. This preliminary treatment is necessary to overcome the effects of contamination of the azeotropic distillate with the low boiling impurities. Thus the alcohols prepared by the treatment of olefins with sulfuric acid are associated with substantial quantities of water and smaller amounts of hydrocarbon compounds, some of which are substances from the olefin supplies and others are miscellaneous products derived therefrom by the action of sulfuric acid. Many of the impurities have appreciable solubilities in both water and the alcohols and also form azeotropic compositions of widely different boiling points with the alcohols. Thus, in continuous processing, losses of valuable materials occur if the lower boiling impurities are permitted to contaminate the main azeotropic distillate. This effect is general and occurs with organic liquids which are either miscible or immiscible with water. The effect is particularly significant, however, in the case of the relatively water soluble organic liquids, because the impurities when present in the azeotropic distillate adversely affect phase separation. A similar problem is presented in the purification of ethyl alcohol produced by fermentation, because in that case acetaldehyde is produced, which is soluble in both water and the alcohol.

The process of the present invention is an improved purification procedure for organic liquids which, as generally prepared, are associated with water and low boiling impurities. The process of the invention may combine the removal of relatively low boiling impurities with water removal by maintaining a proper balance between the removal of the impurities and water during the distillation treatment. The invention is an efficacious purification procedure for the removal of low boiling constituents and the physical dehydration of alcohols, ketones, esters and acids which either have significant solubility in water, or being relatively immiscible with water, form constant boiling mixtures with water.

The invention combines the principles of fractional distillation and azeotropism. Thus in the purification of a lower monohydric alcohol or an organic liquid of similar solubility characteristics, a distillation column may be operated to remove the lower boiling impurities and to effect physical dehydration by azeotropic distillation. The ternary azeotrope so formed while boiling at a lower temperature than any of its components or combination thereof must boil at a higher temperature than the low boiling impurities as present in the distillation system, and thus have as the distillation residue the organic liquid freed from low boiling impurities and water. Desirable operation in these cases also requires that the azeotropic distillate upon condensation be separable into two liquid phases: one phase consisting largely of entrainer and smaller quantities of organic liquid and water; and the other layer consisting largely of water and the organic liquid and a small quantity of the entrainer compound. In order that the system operate advantageously, the aqueous layer should contain a higher percentage of water than the feed supply to the distillation column and the entrainer layer should thus contain a lower percentage water content than the feed supply and permit the satisfactory use of this entrainer layer as reflux in the distillation column and return in this manner most of the entrainer compound supplied to the system. In the case of an organic liquid which is relatively immiscible with water and which with water forms a constant boiling mixture, the addition of an entrainer compound is not ordinarily necessary to effect a separation of phases in the distillate, but contamination with impurities which have solubilities both in water and the organic liquid will adversely affect such diphase separation.

When the crude supply contains impurities which form constant boiling mixtures with the organic liquid to be treated and with water, the main azeotrope distillate is contaminated with these compositions and when the resultant mixture is condensed to a convenient operating temperature, the effect may be that diphase separation will not satisfactorily occur. The method of the invention in regard to the relatively water soluble organic liquid is, therefore, to separate these lower boiling impurities and to select from the known entrainer compounds a member which forms with water and the organic liquid to be treated a ternary azeotrope of boiling point sufficiently above that of the impurities or any constant boiling mixture formed therewith so that separation can readily be made in the distillation column between the main ternary azeotrope and the lower boiling impurities and the constant boiling mixtures formed with these lower boiling impurities among themselves and with the organic liquid and water.

The improved feature of the invention is, therefore, to remove the lower boiling impurities as a separate stream from that of the ternary azeotrope of the organic liquid, water and the entrainer compound and thus to lessen contamination of the azeotrope with such compounds. With an organic liquid relatively immiscible with water, the method of the invention may be applied to insure good separation of the binary constant boiling mixture with water and to counteract in it the adverse effect upon diphase separation of the presence of the impurities. Improved phase separation in the binary mixture separated from the distillation column may be made by adding to the mixture a compound miscible with either water or the organic liquid but not miscible in both. In this way the adverse effect of either the impurities present in the mixture or the solubility of the organic liquid for the amount of water present therein may be counteracted.

The added entrainer compounds which have been found to be particularly advantageous for use in this invention are the hydrocarbon entrainer compounds of very limited solubility in water. Particularly suitable compounds are the hydrocarbons of the $C_8$–$C_{12}$ range and especially the unsaturated hydrocarbon polymers formed by the polymerization of the lower olefins either alone or in admixture with each other.

The invention is illustrated by the processing hereinafter described in connection with the accompanying drawing, Figure 1. The drawing indicates a suitable lay-out of processing equipment and the manner in which the equipment may be utilized. The drawing presents one form of equipment for carrying out the process. In the drawing there is a distillation column 1, of customary design which is usually of the bubble plate type. This column is furnished with a means of supplying heat 16, and connected to a condenser 5, coolers 10 and 18, and to a decanter 12. In order to establish a higher order of processing efficiency a more extended treatment may be given to the feed stocks and to the products of the process by the use of an additional distillation column 21, for concentrating the stream 22 from the manufacturing unit, and for recovering the organic liquid and added entrainer compound from the aqueous layer of the azeotropic distillate from column 1.

Usually the feed supply of the crude organic liquid consists of a distillate stream from a manufacturing unit and contains lower boiling impurities and water in an amount of about that contained in the binary constant boiling mixture. The heat supply to the distillation column 1 through means 16 and the control upon fractionation by means of reflux are regulated to allow for the separation as overhead through line 4 of the low boiling impurities in sufficient quantity to furnish adequate reflux to insure good fractionation in the distillation column and to permit the separation through line 9 of a side stream of a fairly definite composition containing almost all of the water supplied to the column in the crude supply through line 2.

The feed supply of the crude organic liquid from which most of the water has been removed is added through line 2 to the distillation column 1. When the liquid to be purified is relatively miscible with water and contains substantial quantities of low boiling impurities, an entrainer compound is usually added through line 3 just above the point of introduction of the feed supply through line 2 in an amount to form a ternary azeotrope with practically all of the water content in the material fed through line 2. When impurities which are particularly effective entrainer compounds are present in amounts sufficient to separate a large portion of the water as a component of an azeotrope of suitable boiling point, no addition of entrainer compound need be made through line 3. Also, no entrainer compound is added through line 3 in the case of the organic liquids which are relatively immiscible with water.

The low boiling impurities are removed as vapors from the top of the column through line 4 to the condenser 5 and the condensate is separated at 6. A portion of the condensate is removed through line 8 to equipment for recovery of the lower boiling impurities, while the remainder is passed through line 7 for reflux to the distillation column 1.

Since the ternary azeotrope of the organic liquid, added entrainer compound and water is higher boiling than the lower boiling impurities removed at the top of the column, but lower boiling than any other possible combination of materials present, it will tend to accumulate on an intermediate plate of the column. In the case of an organic liquid which is relatively immiscible with water and requires no entrainer, the binary azeotrope of this organic liquid and water will similarly tend to accumulate in the column.

A side stream 9 is withdrawn from the column at the point in the column where the concentration of the azeotrope, ternary or binary as the case may be, reaches a maximum. This side stream which will contain practically all of the water will be essentially the azeotropic composition, but will be slightly contaminated with the lower boiling impurities which must pass through the zone of maximum concentration of azeotrope in order to reach the top of the column. The side stream, which may be either vapor or liquid, is passed through cooler 10 and thence as a liquid through line 11 to the decanter 12. The decanter 12 is of sufficient capacity to permit, with the rate of normal supply thereto, good phase separation. When an entrainer compound has been added to the column through line 3, the stream 9 has a composition approximately that of the ternary azeotrope formed therewith in the column which, in the decanter 12, separates into two desirable liquid phases. In the absence of an entrainer compound added through line 3, the stream 9 may be a binary constant boiling mixture formed with the water present and some of the organic liquid, or it may be a mixture of those binary and ternary azeotropes formed with quantities of the water and organic liquid and some of the hydrocarbon impurities functioning as entrainer compounds. The composition in the decanter 12 in these cases will separate into two phases only when either the organic liquid is relatively immiscible with water and any impurities present do not prevent diphase separation or a specific relationship is attained by which particular mixtures of the binary and ternary azeotropes actually formed do separate into two phases. When the mixture in the decanter 12 is a single phase system as generally results when the composition taken through line 9 is a binary composition formed with water and an organic liquid having substantial solubility in water, or does not form a suitable diphase system readily, an entrainer compound, preferably of the type disclosed in copending application Serial No. 371,856, is added to the mixture through the line 3a.

The significance of the decanter 12 may be minimized when sufficient amounts of entrainer compounds are present in the distillation column 1 to ensure the formation of a diphase ternary azeotrope by having the phase separation occur to a satisfactory extent in the column itself. This may be effected by suitable adjustments upon the plate from which the side stream 9 is taken so as to remove from that plate the aqueous phase only, or by having within the column at about that level separator equipment to insure that through line 9 is passed the aqueous phase only. The aqueous layer thus obtained at a temperature about that of the boiling point of the ternary azeotrope is removed as desired, while the other layer, together with unremoved aqueous layer, is refluxed in the column. The aqueous stream thus removed through line 9 is poorer in water and richer in entrainer than the layer obtained by decantation at lower temperatures and by cooling this aqueous stream a further separation of entrainer compound can be effected. Operating in this manner thus allows the removal of almost all the entrainer compound in the aqueous phase separations from the ternary azeotrope distillate and also the removal by these phase separations of a higher percentage of water than by a single decantation in the cold. The cooler 10 and decanter 12 are then used as auxiliary equipment to remove from the stream passing through line 9 the additional quantities of entrainer compound that separate as a result of the cooling effected and the settling conditions in the decanter 12.

The addition of the entrainer compound to the decanter 12 serves as a means of effecting not only diphase separation in the decanter but also of supplying the entrainer to the system when the upper phase is used as reflux to the distillation column 1. It also may be used to make up the entrainer compound which is lost from the system as a result of processing. When the crude organic liquid contains hydrocarbon impurities which form ternary azeotropic mixtures with the organic liquid and water, the azeotrope so formed may be removed through line 9. In such a case the entrainer compound may be added either through line 3 to assure all the water being removed as a separable mixture through line 9, or through 3a to assure satisfactory phase separation in decanter 12. In either case the upper entrainer phase which is returned to column 1 from the decanter 12 through line 13 will contain the major part of the added entrainer compound in addition to the hydrocarbon impurities which themselves act as entrainers. The entrainer layer is added to the column 1 at a plate just below that from which the side stream 9 is withdrawn. In such a case, the entrainer type of impurities tend to accumulate in the system due to the content of these impurities in the crude supplied to the column. The excess, equivalent to the amount supplied by the feed, is advantageously withdrawn from the system in concentrated form through line 14 and separately treated for recovery of the organic liquid and entrainer compound contained therein. The lower aqueous layer from the decanter 12 is withdrawn from the system through line 15 and passed to a separate distillation system for recovery of its content of organic liquid and entrainer compounds.

In the case of an organic liquid which is relatively immiscible with water, such as hexylalcohol, no entrainer need be added normally through line 3. However, should phase separation in decanter 12 be unsatisfactory due to the presence of impurities which are soluble both in the organic liquid and water or the mutual solubility of the organic liquid in water, addition of entrainer compound may be made directly to decanter 12 through line 3a in an amount necessary to bring about satisfactory phase separation. In this case when the layer containing the majority of organic liquid and the entrainer compound is returned as reflux to the distillation column 1 the entrainer contained therein causes the formation thereafter of the ternary azeotrope of the organic liquid, water and the added entrainer compound. However, in the case of relatively water-insoluble organic compounds, such as hexylalcohol, it may not be necessary to add entrainer compound in sufficient quantities to form the ternary azeotrope containing all the water present. The side stream withdrawn through line 9 will in such cases contain a mixture of the binary azeotropic mixture of the organic liquid and water and the ternary azeotrope of organic liquid, added entrainer compound, and water.

The purified dehydrated organic liquid flows to the bottom of the distillation column 1 and is withdrawn through line 17 to the cooler 18 and through line 19 to storage.

Figure 1 also shows additional equipment, consisting of a distilling column 21 of conventional design with heat supplied thereto by open steam connection 29, condenser 24, means for separating the condensate 25 and the interconnecting piping shown, which can be employed for concentrating the crude stream from the manufacturing unit before supplying through line 2 to the distillation column 1 for the recovery of the organic liquid and entrainer compounds contained in the aqueous layer from the decanter 12. Thus the stream from the manufacturing unit is passed through line 22 to the distillation column 21. The overhead vapors containing water and the organic liquid in high concentration are removed from line 23 and condensed in equipment 24. Division is made of the condensate at 25, part being returned as reflux to the column 21 through line 26 while the remainder is passed through line 2 as feed to the distillation column 1. Steam is injected into column 21 at the base through pipe 29. Water and high boiling impurities are removed through line 28. The lower layer from the decanter 12 is passed by means of line 15 and pump 20 through line 27 to a place in column 21 where the concentration of the organic liquid corresponds approximately to that of the composition of the stream. By this means the organic liquid and entrainer compound in the aqueous layer in decanter 12 are removed and returned to the purifying column with the distillate from column 21.

To illustrate specifically the process of the invention, the following three examples are presented. In the descriptions reference should be made to Figure 1.

*Example 1*

This example is presented to illustrate the purification of an organic liquid which contains in solution as impurities, substantial quantities of water and lesser amounts of organic compounds having lower boiling points than the organic liquid to be purified and slight tendencies, if any, to form with the organic liquid and/or water, diphase constant boiling mixtures of lower boiling points than that of the organic liquid to be purified. Representative of this class is the purification treatment applied under atmospheric pressures of organic liquids such as the alcohols and ketones of substantial solubility in water. Thus in the purification of ethyl alcohol produced by fermentation, separation is made by the process of this invention of small quantities of acetaldehyde. In the preparation of synthetic ethyl alcohol, the main impurity which has to be removed is ethyl ether. For purposes of illustration, the purification of methyl ethyl ketone will be taken. A supply of methyl ethyl ketone from a manufacturing unit usually contains as impurities up to about 10% water and smaller quantities of acetone and low boiling hydrocarbons.

As specific illustration, a stream of composition upon the volume basis

| | Per cent |
|---|---|
| Methyl ethyl ketone | 89.2 |
| Water | 8.8 |
| Low boiling impurities | 2.0 | is taken as the stream and passed through line 2 to the distillation column 1. Through line 3 is passed benzene in sufficient amounts to form with the water content of the feed supply through line 2, a ternary azeotrope having a volume composition of:

| | Per cent |
|---|---|
| Benzene | 46.9 |
| Methyl ethyl ketone | 33.0 |
| Water | 20.1 |

Temperature control is maintained in the tower by means of the regulation of heat supply through means 16 and reflux ratio of 16 to 1 in the column so that a temperature of about 65° C. is maintained at the top of the column just below the vapor line 4 and the temperature of about 70° C. on the plate, from which the side stream 9 is taken.

The overhead stock passing from column through line 4 to the condenser 5 is of composition

| | Per cent |
|---|---|
| Low boiling impurities (acetone and hydrocarbons) | 50 |
| Methyl ethyl ketone | 45 |
| Water | 5 |

The condensate is separated into two streams; through line 7 is passed the reflux to the column 1 and through line 8 a quantity equal to the content of low boiling impurities in the feed stock during continuous operation after the system has become satisfactorily established on a continuous basis. Through line 9 is taken a stream having the composition by volume:

| | Per cent |
|---|---|
| Methyl ethyl ketone | 33 |
| Benzene | 47 |
| Water | 20 |

After passing through the cooler 10 and line 11, this stream separates in the decanter 12 into two phases, the compositions of which by volume are, respectively:

| | Upper layer | Lower layer |
|---|---|---|
| Benzene | 58.9 | 0.2 |
| Methyl ethyl ketone | 40.1 | 6.2 |
| Water | 1.0 | 93.6 |

The upper layer is passed through line 13 to the distillation column 1, where it enters at a point just below the point at which the side stream 9 is taken. The lower layer is removed through line 15 and subsequently treated in a distillation column such as shown by numeral 21 to recover its content of methyl ethyl ketone and benzene. The highly purified methyl ethyl ketone is removed through line 17, the cooler 18 and through line 19 to storage.

*Example 2*

This example is presented to illustrate the purification of an organic liquid which contains in solution in addition to the impurities considered in the liquids purified according to Example 1, organic compounds having the property of forming with the organic liquid to be purified and/or water, constant boiling mixtures which are separable upon condensation into two phases. These additional organic impurities, therefore, function in the system in a manner similar to the benzene, added in case of the purification of methyl ketone discussed in Example 1. The purification treatment in these cases is applicable to most of the alcohols, ketones, esters and acids as normally obtained from manufacturing units. The purification of isopropyl alcohol as obtained from the manufacturing unit by the treatment of propylene with sulfuric acid may be conveniently taken as an example of the purification of liquids of this class.

In the production of isopropyl alcohol from propylene by treatment with sulfuric acid and subsequent hydrolysis of the reaction mixture, the hydrocarbon impurities which occur in the aqueous isopropyl alcohol solution are mainly the deterioration and polymeric products derived from propylene. Many of the hydrocarbon impurities function as entrainer compounds with the alcohol and/or water forming azeotropes of lower boiling point than that of isopropyl alcohol. These hydrocarbon compounds when present in the distillate in any azeotropic dehydration process will function in a manner similar to an added entrainer compound, giving a condensate which will satisfactorily separate into two phases.

Isopropyl alcohol, as obtained from the manufacturing unit, is passed through a distillation column of the type designated in the drawing by numeral 21. As overhead from this column, a composition by volume of 86.0% isopropyl alcohol, 2.6% of isopropyl ether, 8.8% of water and 2.6% of hydrocarbon impurities which have the property of functioning as entrainers in the system, is obtained. This composition is supplied through line 2 to the distillation column 1. The temperature at the top of column 1 is maintained at about 61° C. which is the boiling point of the azeotropic composition containing 11.4% isopropyl alcohol, 84.4% isopropyl ether and 4.6% of water. The heat supplied to the base of column 1 through means 16 is adjusted so that the vapor equivalent to approximately three times the feed is taken overhead through line 4, condensed in equipment 5 and returned as reflux through line 7 to column 1, in order to maintain proper functioning of the column. A small portion of this condensate sufficient to remove the lower boiling impurities contained in the feed is separated at 6 and withdrawn from the system through line 8.

From the plate on which the maximum concentration of the ternary of isopropyl alcohol, water and entrainer impurities is obtained, withdrawal of a side stream is made through line 9. The composition of this stream is determined largely by the amount of the entrainer type impurities accumulated in the system as a result of continuous supply of feed stock. Initially the side stream withdrawn through line 9 approaches the composition of the binary azeotrope of isopropyl alcohol and water but contains small amounts of ternary azeotrope. The temperature at the point of withdrawal of the side stream 9 in this case is about 77.5° C., that is the boiling point of the binary azeotrope of isopropyl alcohol and water. The condensate of the side stream as obtained initially in the operation of the system, fails to be satisfactorily separable into phases because of the low content of entrainer type impurities. Through line 3a, therefore, is added controlled amounts of di-isobutylene to effect a satisfactory degree of phase separation. As in Example 1, the upper layer containing the larger amount of the entrainer compounds, is returned to the distillation column 1, thus increasing the amount of entrainer compounds in the distillation column. In this manner, increased amounts of ternary azeotropes are formed in the distillation column, and as a result, a lowering in temperature occurs at the point of withdrawal of the side stream 9. This mode of operation is continued until the composition of the side stream is essentially that of the combined ternary azeotropes, of the entrainer compounds, isopropyl alcohol and water. When this point is reached satisfactory phase separation is attained and the temperature on the plate from which the side stream 9 is taken becomes about 72° C., that is the boiling point of the ternary azeotrope of isopropyl alcohol, water and di-isobutylene, since the entrainer compounds function very similarly to di-isobutylene as an entrainer compound. With this mixture satisfactory phase separation is attained in the decanter 12 and no more entrainer compound need be added. As the process is continued additional amounts of entrainer compounds are introduced into the system through the feed supply through line 2 and accumulate in the system. This excess amount of entrainer compounds must be removed from the system in order to maintain optimum processing conditions. Separation is made of these excess amounts of entrainer compounds by removing, through line 14, amounts of the entrainer phase containing the entrainer compounds equal to the content in the feed supply through line 2.

The upper layer having a composition of 68.2% of di-isobutylene, 4.9% isopropyl ether, 24.7% isopropyl alcohol and 2% water is returned through line 13 to the distillation column 1 to the place immediately below the point of withdrawal of the side stream through line 9. The lower aqueous layer in the decanter 12 has a composition of 6.9% di-isobutylene, 58.6% isopropyl alcohol, 34.5% of water and traces of isopropyl ether. This lower aqueous layer is removed from the system through line 15 for separate recovery of its alcohol content.

The highly purified isopropyl alcohol is removed through line 17 and into the cooler 18 and then through line 19 to storage equipment.

*Example 3*

This example is presented to illustrate the purification of an organic liquid which has associated with it water partly in solution and partly in suspension and low boiling impurities which interfere with the separation of the condensate into phases. When a liquid, which is relatively immiscible with water is distilled in the presence of water, a binary constant boiling mixture is formed which contains the constituents in proportion to their vapor pressures at the temperature at which the mixture boils. Ordinarily, this constant boiling mixture will contain a higher proportion of water than that which is miscible with the liquid. When the constant boiling mixture is condensed it will separate, therefore, into two phases, one phase consisting of the liquid saturated with water and the other phase consisting of water saturated with the liquid. Hence, physical dehydration of the liquid can be readily effected by distillation of the constant boiling mixture, withdrawing the aqueous layer from the system and returning from the condensate the phase containing liquid saturated with water until all the water has been removed. However, with organic liquids, which contain as impurities in addition to water, compounds which are soluble in both water and the organic liquid, phase separation in the condensate does not occur or is unsatisfactory. The method of this invention provides an advantageous means of separating such type impurities and accomplishing satisfactory physical dehydration of the organic liquid.

Thus the extraction of highly purified amyl alcohol from fusel oil obtained in the preparation of ethyl alcohol by fermentation can be satisfactorily accomplished by removing, according to the method of this invention, the quantities of ethyl alcohol and water normally present in the crude fusel oil. Also, the preparation of relatively pure n-butyl alcohol can be made from the liquor obtained by the bacterial fermentation of carbohydrate materials. The crude n-butyl alcohol obtained from the fermented liquor normally contains substantial quantities of ethyl alcohol and water. In order to obtain satisfactory physical dehydration of the n-butyl alcohol, the ethyl alcohol must first be removed. The preparation of relatively pure n-butyl alcohol from the bacterial fermentation of carbohydrates can be taken as an example of the purification of impure liquids of the third class.

As specific illustration, a stream of composition upon the volume basis

| | Per cent |
|---|---|
| n-Butyl alcohol | 76.5 |
| Water | 21.0 |
| Low boiling impurities (ethyl alcohol, etc.) | 2.5 | is taken as the feed supply to the distillation column 1 as supplied through line 2. With adequate temperature control upon the distillation column, the temperature at the vapor exit 4 is maintained at about 78° C. To maintain this temperature a reflux ratio of about 60 to 1 is maintained. The composition of the vapor which is passed through line 4 and condensed in equipment 5 has the composition by volume of

| | Per cent |
|---|---|
| Ethyl alcohol | 95 |
| Water | 5 |

At the point where the n-butyl alcohol-water constant boiling mixture is a maximum the side stream 9 is taken from the system. At this point the temperature is about 92° C. and the composition by volume of the stream is

| | Per cent |
|---|---|
| n-Butyl alcohol | 58.5 |
| Water | 41.4 |
| Ethyl alcohol | 0.1 |

After passing through the cooler 10 and allowing phase separation in the decanter 12, two phases are obtained the composition by volume of which is

|  | Upper layer | Lower layer |
|---|---|---|
|  | Per cent | Per cent |
| n-Butyl alcohol | 80.5 | 7.9 |
| Water | 19.5 | 91.7 |
| Ethyl alcohol | | 0.4 |

The upper layer is passed through line 13 to the distillation column 1 where it enters at a point just below the point at which the side stream is taken. The lower layer is removed through line 15 and subsequently treated in a distillation column such as shown in the diagram by numeral 21, in order to recover its content of n-butyl alcohol. The highly purified n-butyl alcohol is removed through line 17, through the cooler 18 and through line 19 to storage.

It is worthy of particular note that in the decanter 12 a di-phase separation is obtained in which the upper alcohol layer has an appreciable content of water. By the addition to the condensate in the decanter 12 of a compound such as di-isobutylene, which is miscible with the n-butyl alcohol, but relatively immiscible with water, a more satisfactory di-phase separation is obtained, that is, in the upper layer, smaller contents of water occur and by returning this layer to the distillation column, more satisfactory di-phase separation than in the absence of di-isobutylene or other entrainer compound is obtained continuously thereafter. When the di-isobutylene is employed to effect the separation of a phase containing almost all of the water in the side stream material through line 9 a substantial reduction in the reflux ratio in the distillation occurs also.

While the purification of three classes of organic liquids have been considered and illustrated by the presentation of three specific examples, the purification of many crude supplies of organic liquid present intermediate cases. Thus in the purification of the secondary butyl alcohol obtained from the treatment of the n-butylenes with sulfuric acid some of the impurities function as effective entrainer compounds. This applies particularly to the hydrocarbon polymer products containing eight to twelve carbon atoms in the molecule. Since secondary butyl alcohol is not completely miscible with water, the presence of relatively small amounts of the above hydrocarbon impurities reduces the solubility of the alcohol in water to the extent where satisfactory di-phase separation is obtained from the side stream taken from the distillation column at the plate where the concentration of the secondary butyl alcohol-water constant boiling mixture is at a maximum. When the $C_8$–$C_{12}$ hydrocarbon impurities are present in the crude feed to the distillation column 1, the side stream, consisting of approximately the secondary butyl alcohol-water constant boiling mixture, will contain some of the ternary azeotropes of the hydrocarbons, the alcohol and water, and as a result phase separation will occur in the decanter. Return of the phase containing the major part of the hydrocarbon impurities to the distillation system results in an increase in the amount of ternary azeotropes present in the column, and consequently gives better phase separation in the decanter. With continued operation the concentration of the ternary azeotropes will increase until the stream before phase separation consists almost entirely of the ternary azeotropes. Beyond this point it becomes necessary to remove an amount of the hydrocarbons equal to the amount introduced in the feed to the distilling column. This is most conveniently accomplished by removing a suitable portion of the hydrocarbon phase through line 14.

This invention is not limited to the specific embodiments shown herein as it is possible to produce still other embodiments without departing from the inventive concepts herein disclosed.

What is claimed is:

1. The process of purifying an organic liquid selected from the class of alcohols and ketones boiling between 78° F. and 138° F. with which is associated as impurities substantial quantities of water and lesser amounts of low boiling compounds, which comprises distilling the mixture so as to take off in a single fractionating column as overhead low boiling impurities, a distillation residue of relatively pure organic liquid, and an intermediate fraction as a side stream containing almost all of the water in the said original mixture; cooling the side stream material, allowing said material to settle, adding as required an entrainer compound selected from the group consisting of hydrocarbons containing from 8 to 12 carbon atoms in the molecule miscible with the organic liquid but relatively immiscible with water in an amount sufficient to effect the separation of a phase therein containing almost all of the water in the said material, removing this phase from the system and returning the other phase for further treatment.

2. The process of purifying an organic liquid selected from the class of alcohols and ketones boiling between 78° F. and 138° F. with which is associated as impurities substantial quantities of water and lesser amounts of low boiling compounds, which comprises distilling the mixture so as to take off in a single fractionating column as overhead low boiling impurities, a distillation residue of relatively pure organic liquid, and an intermediate fraction as a side stream comprising the organic liquid and most of the water in the said original mixture; cooling the side stream material, allowing said material to settle, adding as required an entrainer compound selected from the group consisting of hydrocarbons containing from 8 to 12 carbon atoms in the molecule miscible with the organic liquid but relatively immiscible with water in an amount sufficient to effect the separation of a phase therein containing almost all of the water in the said material, removing this phase from the system and returning the other phase for further treatment.

3. The process of purifying an organic liquid selected from the class of alcohols and ketones boiling between 78° F. and 138° F. containing as impurities substantial quantities of water and organic compounds some of which have the property of forming with the organic liquid and water di-phase constant boiling mixtures, which comprises distilling the mixture so as to take off in a single fractionating column as overhead low boiling impurities, a distillation residue of relatively pure organic liquid, and collecting as an intermediate fraction condensate within the column at a point where the concentration of the constant boiling mixture reaches a maximum; allowing the condensate material to settle, adding as required an entrainer compound selected from the group consisting of hydrocarbons containing from 8 to 12 carbon atoms in the molecule miscible with the organic liquid but relatively immiscible with water in an amount sufficient to effect the separation of a phase therein containing almost all of the water in the said condensate material, withdrawing the aqueous layer, refluxing the other layer in the column, cooling said aqueous layer, passing the resultant cooled aqueous mixture to a decanter, returning any non-aqueous phase separation to the distillation system and removing the residual aqueous solution.

4. The process of purifying an organic liquid selected from the class of alcohols and ketones boiling between 78° F. and 138° F. containing as impurities substantial quantities of water and lesser amounts of organic compounds having insignificant entrainer properties and lower boiling points than the organic liquid, which comprises adding to the said mixture a hydrocarbon entrainer compound selected from the group consisting of hydrocarbons containing from 8 to 12 carbon atoms in the molecule which forms with the organic liquid to be purified and water a di-phase ternary azeotrope, distilling the mixture so as to take off in a single fractionating column as overhead low boiling impurities, a distillation residue of relatively pure organic liquid collecting condensate as an intermediate fraction within the column at a point where the concentration of the diphase ternary azeotrope reaches a maximum; allowing the condensate material to decant, withdrawing the aqueous layer, refluxing the other layer in the column, cooling said aqueous layer, passing the resultant cooled aqueous mixture to a decanter, returning the non-aqueous phase separation to the distillation system and removing the residual aqueous solution.

5. The process of purifying an organic liquid selected from the class of alcohols and ketones boiling between 78° F. and 138° F. containing in solution as impurities substantial quantities of water and lesser amounts of organic compounds having insignificant entrainer properties and lower boiling points than the organic liquid, which comprises adding to the said mixture a hydrocarbon entrainer compound selected from the group consisting of hydrocarbons containing from 8 to 12 carbon atoms in the molecule which forms with the organic liquid to be purified and water a diphase ternary azeotrope, distilling the mixture so as to take off in a single fractionating column as overhead low boiling impurities, a distillation residue of relatively pure organic liquid, and withdrawing as an intermediate fraction a side stream consisting essentially of the diphase ternary azeotrope of the organic liquid, the added entrainer compound and most of the water in said original mixture; cooling the side stream material, allowing said material to settle, removing the aqueous phase from the system and returning the other phase to the distillation column for further treatment.

6. The process of purifying methyl ethyl ketone containing substantial quantities of water and lesser amounts of low boiling impurities, which comprises adding benzene to the said mixture in an amount to form with the water content thereof and methyl ethyl ketone a diphase ternary azeotrope, distilling the resultant mixture so as to take off in a single fractionating column as overhead low boiling impurities, a distillation residue of relatively pure methyl ethyl ketone and an intermediate fraction as a side stream consisting essentially of the diphase ternary azeotrope of methyl ethyl ketone, benzene and water; cooling the side stream material, allowing the phases to separate, removing the aqueous phase from the system and returning the other phase to the distillation column for further treatment.

7. The process of purifying an organic liquid selected from the class of alcohols and ketones boiling between 78° F. and 138° F. containing in solution as impurities substantial quantities of water and organic compounds some of which have the property of forming with the organic liquid and water diphase constant boiling mixtures, which comprises distilling the mixture so as to take off in a single fractionating column as overhead low boiling impurities, a distillation residue of relatively pure organic liquid and withdrawing as an intermediate fraction a side stream consisting essentially of the organic liquid, most of the water in the said original mixture and most of the organic impurities functioning as entrainer compounds; cooling the side stream material, allowing said material to settle, adding as required an entrainer compound miscible with the organic liquid but relatively immiscible with water in an amount sufficient to effect the separation of a phase therein containing almost all of the water in the said material, removing this phase from the system and returning the other phase to the distillation column for further treatment.

8. The process of purifying an organic liquid selected from the class of alcohols and ketones boiling between 78° F. and 138° F. which has associated with it water partly in solution and partly in suspension and low boiling impurities which interfere with phase separation, which comprises distilling the mixture so as to take off in a single fractionating column, separating as overhead low boiling impurities, a distillation residue of relatively pure organic liquid and as an intermediate fraction the side stream comprising the organic liquid and most of the water in the said original mixture; cooling the side stream material, allowing said material to settle, adding as required an entrainer compound selected from the group consisting of hydrocarbons containing from 8 to 12 carbon atoms in the molecule miscible with the organic liquid but relatively immiscible with water in an amount sufficient to effect an improved separation of a phase therein containing almost all of the water in the said material, removing this phase from the system and returning the other phase to the distillation column for further treatment.

9. The process of purifying a $C_2$ to $C_4$ alcohol derived from the treatment of an olefin with sulfuric acid, which comprises distilling the alcohol mixture under fractionation conditions in a single fractionating operation, separating as overhead low boiling impurities, distillation residue of relatively pure alcohol and as an intermediate fraction a side stream consisting essentially of the alcohol, most of the water in the original mixture, and the hydrocarbon impurities in said mixture functioning as entrainer compounds; cooling the side stream material, allowing said material to settle, adding as required an entrainer compound selected from the group consisting of hydrocarbons containing from 8 to 12 carbon atoms in the molecule miscible with the alcohol but relatively immiscible with water in an amount sufficient to effect the separation of a phase therein containing almost all of the water in the said material, removing this aqueous phase, returning the other phase to the distillation system for further treatment.

10. The process of purifying a $C_2$ to $C_4$ alcohol according to claim 9 in which the entrainer compound added to the side stream material which is miscible with alcohol but relatively immiscible with water is di-isobutylene.

11. The process according to claim 9 in which the alcohol is isopropyl alcohol derived from the treatment of propylene with sulfuric acid.

12. The process according to claim 9 in which the alcohol is secondary butyl alcohol derived from the treatment of the n-butylenes with sulfuric acid.

JOHN A. PATTERSON.